United States Patent [19]
Dulin et al.

[11] Patent Number: 6,118,201
[45] Date of Patent: Sep. 12, 2000

[54] RESOLVER WITH LEAKAGE FLUX ABSORBER

[75] Inventors: Patrick J. Dulin, Chadds Ford; David E. Hawes, Downingtown; Ray K. Trumbauer, Schwenksville, all of Pa.

[73] Assignee: American Precision Industries Inc., Buffalo, N.Y.

[21] Appl. No.: 08/813,062

[22] Filed: Mar. 7, 1997

[51] Int. Cl.[7] .................................................. H02K 24/00
[52] U.S. Cl. ......................... 310/161; 310/160; 310/171; 310/190; 336/84 R; 336/120; 323/348
[58] Field of Search .................... 336/84 R, 84 C, 336/84 M, 120; 310/161, 171, 211, 160, 190; 318/813, 809, 605; 73/514.31, 514.39; 323/348

[56] References Cited

U.S. PATENT DOCUMENTS

| | | | |
|---|---|---|---|
| Re. 26,501 | 12/1968 | Himmelstein et al. | 336/120 |
| 3,717,029 | 2/1973 | Tveter | 336/120 |
| 4,412,198 | 10/1983 | Reich | 336/120 |
| 5,191,309 | 3/1993 | Laros | 336/120 |
| 5,347,256 | 9/1994 | Yumiki et al. | 336/84 C |
| 5,705,872 | 1/1998 | Loge | 310/161 |

FOREIGN PATENT DOCUMENTS

| | | | |
|---|---|---|---|
| 593351 | 4/1994 | European Pat. Off. | H02K 24/00 |
| 63-192212 | 8/1988 | Japan | 336/120 |
| 2-177517 | 7/1990 | Japan | 336/120 |
| 3-154309 | 7/1991 | Japan | 336/120 |

*Primary Examiner*—Nestor Ramirez
*Assistant Examiner*—B. Mullins
*Attorney, Agent, or Firm*—Hodgson, Russ, Andrew, Woods & Goodyear LLP

[57] ABSTRACT

A brushless resolver comprising a housing, a rotor rotatably mounted in the housing, a rotary transformer comprising a primary winding carried by the housing and secondary winding on the rotor and operatively associated with the primary winding, a resolver comprising a stator winding carried by the housing and a rotor winding on the rotor and operatively associated with the stator winding, characterized by an electromagnetic flux absorber in the housing between the rotary transformer and the resolver for absorbing leakage electromagnetic flux from the rotary transformer so as to reduce any deviation between the indicated electrical position of the rotor and the actual mechanical position of the rotor during each revolution of the rotor. The flux absorber comprises a copper ring between the rotary transformer primary winding and the resolver stator winding so that the leakage flux creates eddy currents in the ring thereby absorbing or reducing the leakage flux. An additional flux absorber in the form of an element of ferromagnetic material can be r provided between the copper ring and the resolver stator winding to absorb stray components of the leakage flux.

15 Claims, 5 Drawing Sheets

RESOLVER WITH LEAKAGE FLUX ABSORBER

BACKGROUND OF THE INVENTION

This invention relates to the art of electrical machines, and more particularly to a new and improved resolver wherein position error due to crosstalk is eliminated.

A basic resolver has a pair of primary windings located at right angles to each other in a rotor and two secondary windings located at right angles to each other in a stator. As the rotor is rotated by a mechanical input, if the rotor winding is excited with a rated input voltage, the output voltage of the one stator winding will be proportional to the cosine of the rotor angle and the output voltage of the other stator winding will be proportional to the sine of the rotor angle.

Thus, the resolver is an analog trigonometric function generator in the form of a rotating transformer which modulates an a.c. excitation signal with the mechanical rotation of the device. The resolver electrical output may be used for position and velocity information. Resolvers are used for moving devices to precise positions with smooth and accurate control, for sensing the position of mechanical devices, for generating speed and position data for robotic, machine tool and aerospace servo applications, and for measuring rotary motion in place of encoders.

In the resolver there is need to transmit the input electrical excitation signal to the rotor windings. Initially this was done using a brush and slip ring sliding contact. Since the brush and slip ring are life-limiting components and can be a source of noise in harsh environments, a brushless resolver was developed wherein a rotary transformer is used to transmit electrical excitation or energy to the rotor.

It has been determined, in accordance with the present invention, that crosstalk between the rotary transformer and the resolver winding in a brushless resolver can give rise to position error in the form of deviation between the indicated electrical position and the actual mechanical position over each revolution of the resolver rotor. It would, therefore, be highly desirable to provide a resolver wherein any deviation between the indicated electrical position of the rotor and the actual mechanical position of the rotor during each resolver revolution is made as small as possible. This must be accomplished by a relatively simple structure which is economical to manufacture.

SUMMARY OF THE INVENTION

It is, therefore, a primary object of this invention to provide a new and improved resolver having reduced position error.

It is a more particular object of this invention to provide a brushless resolver wherein any deviation between the indicated electrical position of the resolver rotor and the actual mechanical position of the rotor during each resolver revolution is made as small as possible.

It is a further object of this invention to reduce crosstalk between the rotary transformer and the resolver winding in a brushless resolver so as to reduce resolver position error arising from such crosstalk.

It is a further object of this invention to provide such a resolver which is relatively simple in structure and economical to manufacture.

The present invention provides a brushless resolver comprising a housing, a rotor rotatably mounted in the housing, a rotary transformer comprising a primary winding carried by the housing and secondary winding on the rotor and operatively associated with the primary winding, means for supplying electrical excitation to the transformer primary winding, a resolver comprising a stator winding carried by the housing and a rotor winding on the rotor and operatively associated with the stator winding, means for obtaining electrical output from the resolver stator winding, and wherein the brushless resolver of the present invention is characterized by electromagnetic flux absorbing means in the housing between the rotary transformer and the resolver for absorbing leakage electromagnetic flux from the rotary transformer so as to reduce any deviation between the indicated electrical position of the rotor and the actual mechanical position of the rotor during each revolution of the rotor. The flux absorbing means comprises a conductive element, such as a copper ring or disk, between the rotary transformer primary winding and the resolver stator winding so that the leakage flux creates eddy currents in the ring thereby absorbing or reducing the leakage flux. In addition, an element of ferromagnetic material can be provided between the conductive ring and the resolver stator winding to absorb additional components of the leakage flux.

The foregoing and additional advantages and characterizing features of the present invention will become clearly apparent upon a reading of the ensuing detailed description together with the included drawing wherein.

BRIEF DESCRIPTION OF THE DRAWING FIGURES

DETAILED DESCRIPTION OF THE ILLUSTRATED EMBODIMENT

Figure 1:
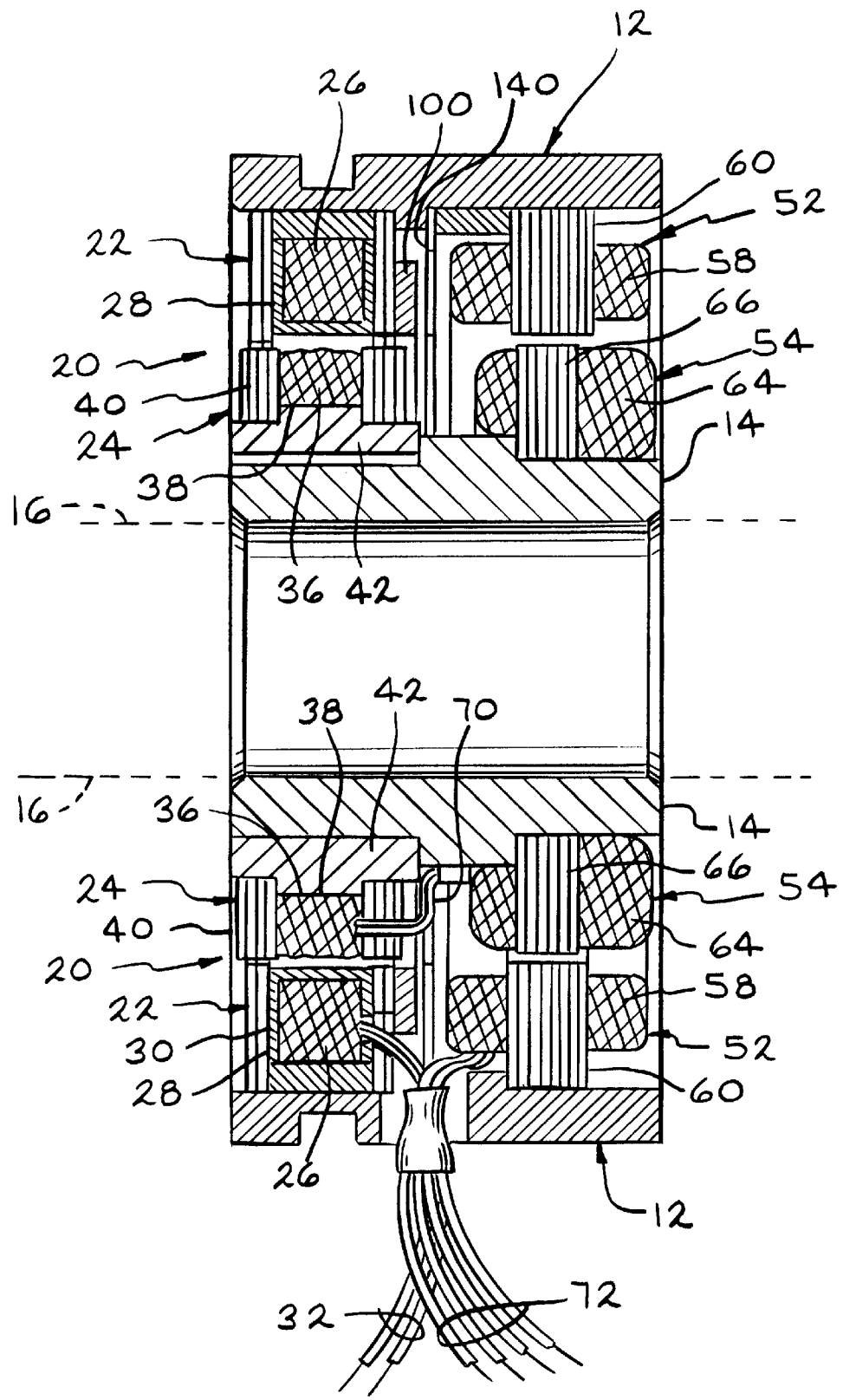
FIG. 1 is a sectional view of a brushless resolver according to the present invention.

Referring first to FIG. 1 there is shown a brushless resolver, generally designated 10, which is of the frameless, hollow-shaft rotor type. Resolver 10 is illustrative of various forms of brushless resolvers to which the present invention is applicable including, for example, resolvers with solid rotor shafts and housed resolvers. Resolver 10 includes a metal or encapsulated housing 12 and an open bore or hollow rotor shaft 14 which is rotatably mounted in housing 12 in a known manner. Rotor 14 is of metal and mounts on a shaft 16 shown in broken lines in FIG. 1 for providing mechanical drive coupling to the mechanical system with which resolver 10 is being used.

Resolver 10, being of the brushless type, includes a rotary transformer generally designated 20 in FIG. 1 including a primary 22 carried by housing 12 and a secondary 24 on rotor 14 and operatively associated with the primary 22. In particular, primary 22 comprises a coil or winding 26, bobbin 28 and laminations 30 of iron or like ferromagnetic material. Primary 22 is fixedly mounted to the inner surface of housing 12 in a known manner and therefore is the stator of rotary transformer 20. The resolver input electrical excitation is applied to primary 22 via input leads 32 whereby coil 26 serves as the primary winding of rotary transformer 20. Secondary 24 similarly comprises a coil 36, bobbin 38 and laminations 40 of iron or like ferromagnetic material. In the illustrative arrangement shown, secondary 24 is fixedly mounted on a sleeve 42 which, in turn, is fixed on rotor 14. Secondary 24 is located on rotor 14 so as to be in flux-linking and thus operative relationship with the transformer primary 22. Thus, coil 36 serves as the secondary winding of rotary transformer 20.

Resolver 10 also includes a resolver stator winding 52 carried by housing 12 and a resolver rotor winding 54 on rotor 14 and operatively associated with stator winding 52. As shown in FIG. 1, the resolver rotor and stator windings 52 and 54, respectively, are located in the resolver 10 so as to be in axially-spaced relation to rotary transformer 20 with respect to the common longitudinal axis of housing 10 and rotor 14. Stator winding 52 comprises the combination of a coil 58 and lamination stack 60 which is fixedly mounted to the inner surface of housing 12 in a known manner. The laminations of stack 60 are of iron or like ferromagnetic material. Rotor winding 54 likewise comprises the combination of a coil 64 and lamination stack 66 which is fixedly mounted to rotor 14 in a known manner. The laminations of stack 66 are of iron or like ferromagnetic material. Winding 54 is located on rotor 14 so as to be in flux-linking and thus operative relationship with resolver stator winding 52.

The secondary 24 of rotary transformer 20 is connected to the resolver rotor winding 54 by leads 70 as shown in FIG. 1. The resolver output electrical signals are present on output leads 72 connected to resolver stator winding 52 as shown in FIG. 1. Thus, winding 52 serves as the output winding of resolver 10.

Figure 3:
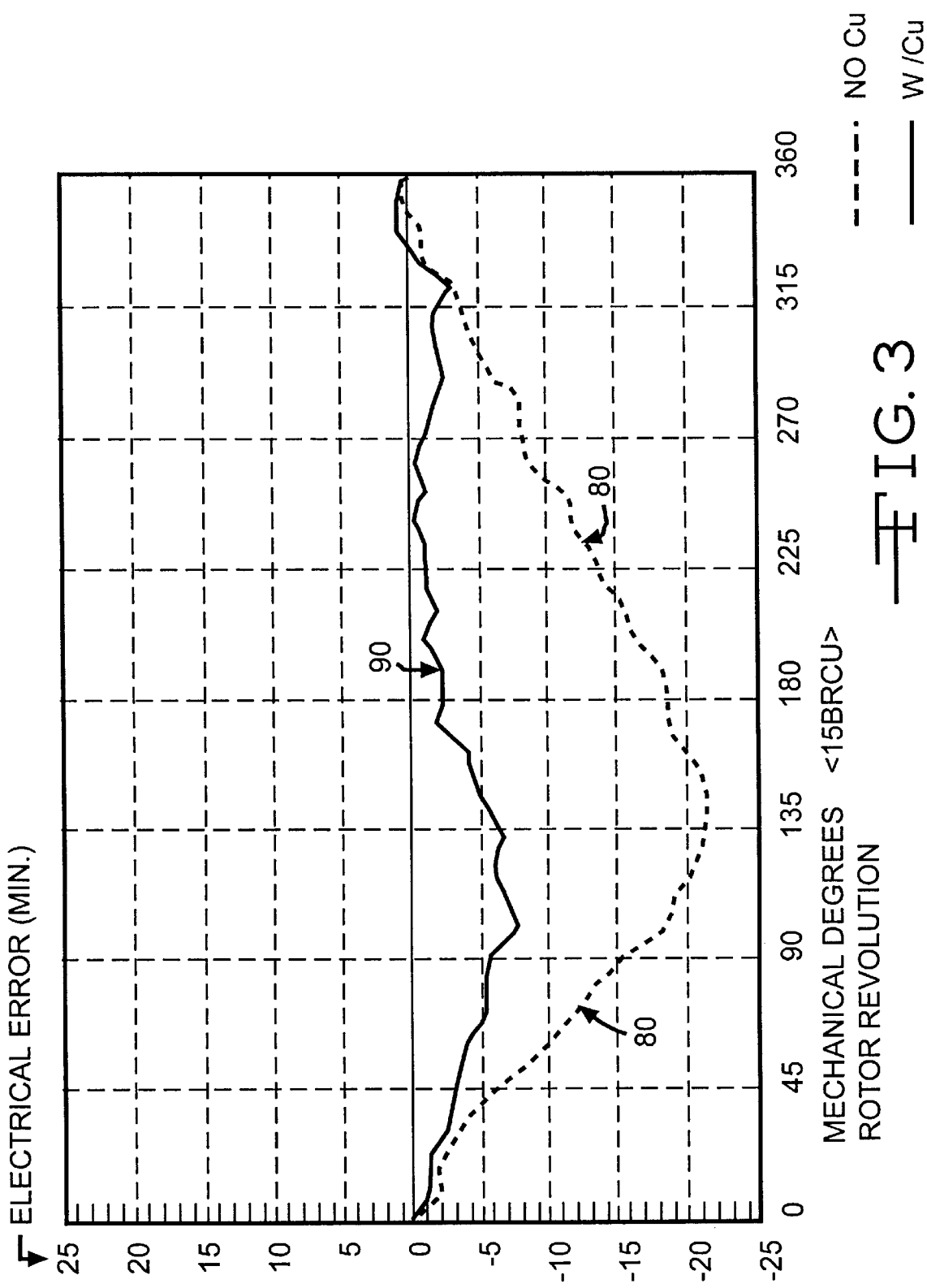
FIG. 3 is a graph including error characteristics for brushless resolvers according to the prior art and according to the present invention.

Resolver 10 as described to this point is typical of prior art brushless resolvers. By way of example, a brushless, frameless resolver is commercially available from Harowe Servo Controls, Inc. of West Chester, Pa. under the model number designation 15BRCX-500. During operation of such prior art brushless resolvers, electromagnetic flux leakage from rotating transformer 20 to resolver stator winding 52 gives rise to a phenomenon known as crosstalk between the transformer and the resolver. In accordance with the present invention it has been determined that such flux leakage can give rise to resolver position error in the form of deviation between the indicated electrical position and the actual mechanical position over each revolution of the resolver rotor. This is illustrated, for example, by curve 80 in the graph of FIG. 3 which shows deviation of the resolver indicated electrical position from the actual mechanical position over one revolution of the resolver rotor shaft. Thus, an electrical error as large as 22 minutes occurs at one point in each cycle of operation of the prior art brushless resolver from which the data for curve 80 was obtained.

The data for curve 80 was obtained by mounting a resolver in a mechanical fixture and coupling its shaft (or rotor assembly, if a frameless device) to a precision mechanical dividing head. The resolver was energized at its rated excitation and the stator output windings were connected to an Angle Position Indicator (API) which electronically converts the signals of the windings to a derived angular position. The dividing head was rotated through one revolution in equal angular increments. At each incremental angular position of the dividing head, the reading of the API was recorded. The difference between the position of the dividing head and the reading of the API was reported as the angular error of the resolver.

Figure 4:
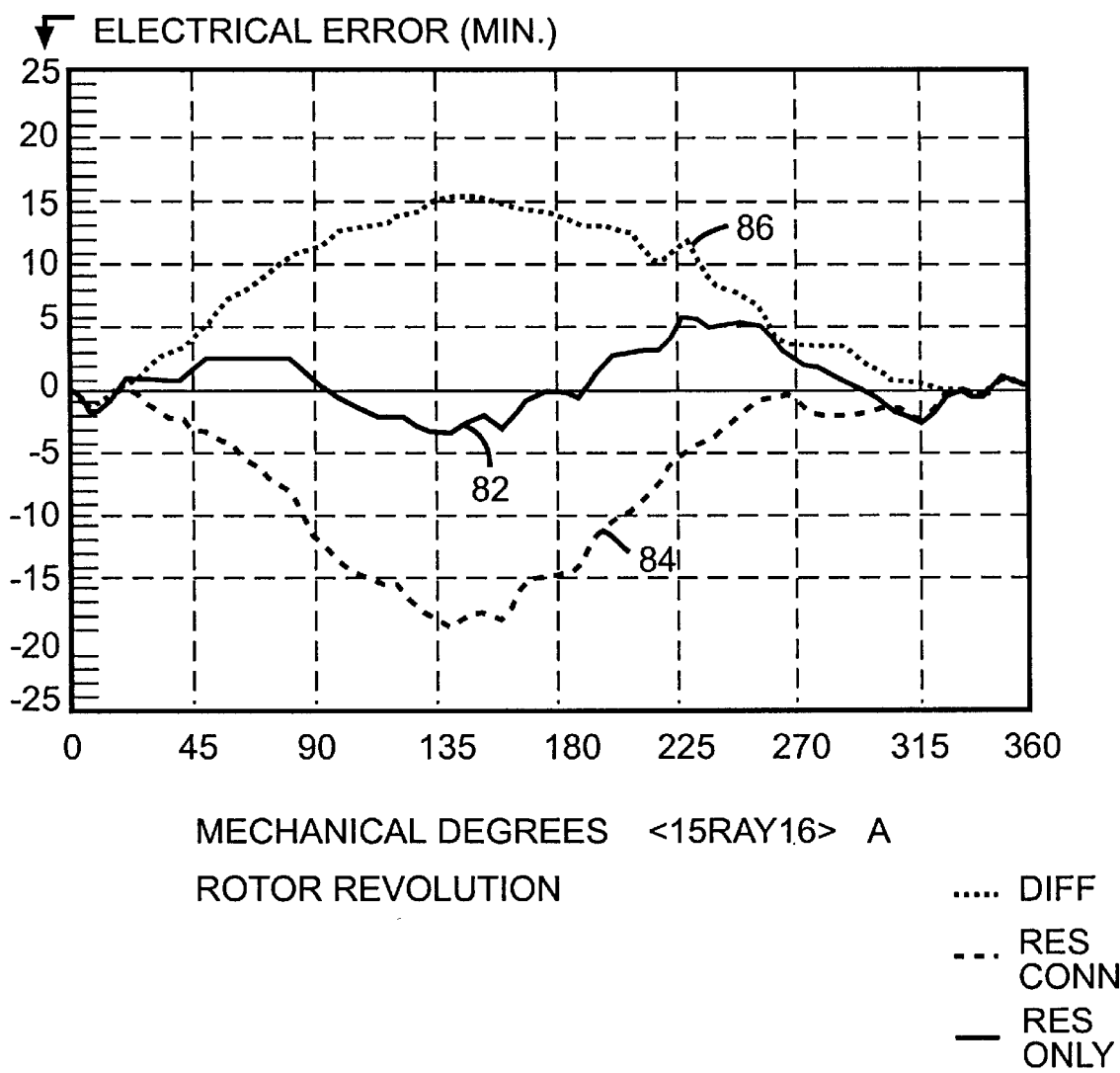
FIG. 4 is a graph including error characteristics for a prior art brushless resolver.

The resolver position error problem is illustrated further in FIG. 4 which includes error curves obtained in a manner similar to that for curve 80 and which are error characteristics for a typical prior art resolver. The solid line curve 82 shows the error obtained when excitation is applied directly to the resolver rotor winding, rather than via the rotary transformer. This arrangement can only be tested in the laboratory, but it illustrates the performance which the unit can achieve if the leakage flux from the rotary transformer is not present. In other words, an error of less than about 5 minutes is encountered over a major portion of the resolver cycle. The broken line curve 84 shows the error obtained for the standard resolver connection, where power is applied to the rotary transformer. The dotted line curve 86 represents the absolute difference between these two curves and indicates the magnitude of the effect of the leakage flux from the rotary transformer on the position accuracy of the device.

In accordance with the present invention, resolver 10 is provided with electromagnetic flux absorbing means in housing 12 between rotary transformer 20 and the resolver for absorbing leakage electromagnetic flux from rotary transformer 20 so as to reduce any deviation between the indicated electrical position of rotor 14 and the actual mechanical position of rotor 14 during each revolution thereof. The flux absorbing means of the present invention provides a dramatic and significant reduction in such deviation as illustrated by the error curve 90 in FIG. 3 for the same resolver used in obtaining data for curve 80 but which resolver is provided with the flux absorbing means of the present invention. As indicated by curve 90, the position error or deviation is reduced significantly to less than 5 minutes over a major portion of each revolution of the resolver rotor.

Figure 2:
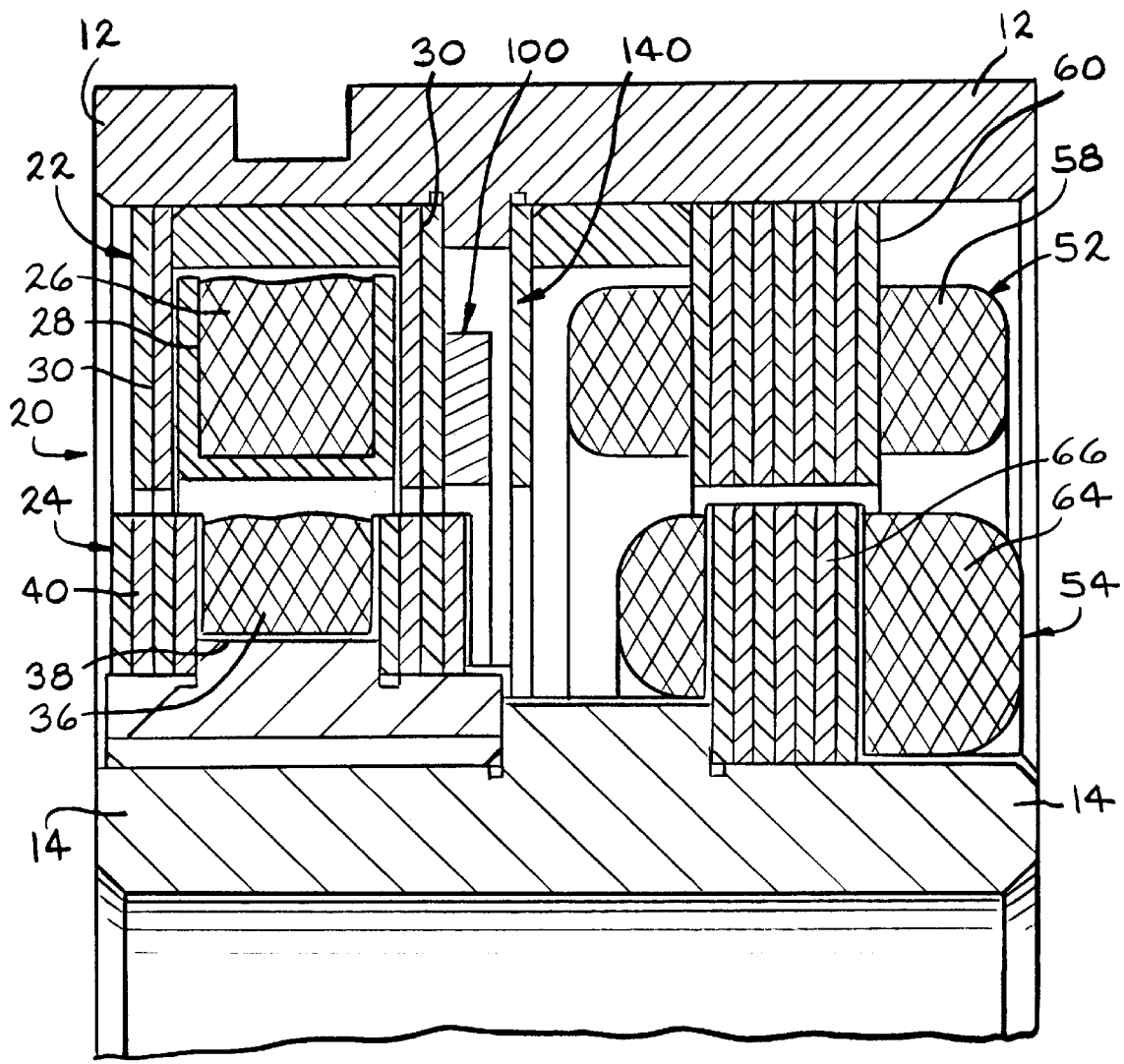
FIG. 2 is an enlarged fragmentary sectional view of a portion of the resolver of FIG. 1.

The electromagnetic flux absorbing means according to the present invention functions to create eddy currents in response to the leakage electromagnetic flux from rotary transformer 20 which eddy currents serve to reduce the leakage flux. Referring now to FIG. 2, the flux absorbing means of the present invention comprises an element 100 of material selected to create eddy currents therein when exposed to electromagnetic flux, in particular a metal electrical conductor preferably of copper. In the resolver shown, element 100 is in the form of a copper ring which is located within housing 12 between the rotary transformer primary winding 22 and the resolver stator winding 52. Ring 100 can be mounted within housing 12 in various ways, and in the resolver shown ring 100 is located with one annular face thereof contacting the outermost one of the transformer primary winding laminations 30 and fixed thereto such as by bonding. Ring 100 is disposed in a plane which is substantially normal to the direction of the leakage electromagnetic flux flowing from rotary transformer 20 toward the resolver winding.

During the operation of resolver 10, leakage flux emitted from rotary transformer 20 flows into copper ring 100 wherein eddy currents are generated in response to the electromagnetic flux which absorbs the flux thereby reducing the amount of leakage flux which can reach the resolver winding 52. Thus the crosstalk between rotary transformer 20 and resolver winding 52 is reduced thereby reducing the position error of resolver 10. Generally speaking, the extent of eddy current generation, which is a result of changing flux with respect to time in a conductor, increases with increasing frequency. Resolvers of the type illustrated herein typically are energized with signals at a frequency which is high enough to provide eddy current generation in ring 100 at a level sufficient to reduce the leakage flux significantly to provide the extent of error reduction illustrated by curve 90 in FIG. 3. By way of example, in an illustrative size 15 brushless resolver, a typical thickness for copper ring 100 would be 0.030 inch. As the excitation frequency decreases, the thickness of ring 100 needs to be increased due to the skin depth effect wherein flux penetrates deeper into the copper material at lower frequency.

The foregoing flux absorption or reduction and consequent position error reduction can be enhanced by providing an additional flux absorbing means in resolver 10. As shown in FIG. 2, the additional flux absorbing means is in the form of an element 140 of ferromagnetic material located between ring 100 and the resolver stator winding 52. Due to the relatively higher permeability of element 140 as compared to the surrounding air, lines of flux tend to be refracted and concentrated in element 140. The conductive ring 100 causes eddy current generation in response to applied leakage flux thereby absorbing or reducing the time-varying component of the leakage flux from rotary transformer 20. Element 140 absorbs any additional components of the leakage flux. In other words, the components of leakage flux absorbed by element 140 are in addition to the principal components of leakage flux absorbed by element 100. In the resolver shown, element 140 is in the form of a thin ring-like plate of ferromagnetic material and can be an additional lamination or laminations similar to either the transformer stator laminations 30 or the resolver stator laminations 60. Satisfactory results, including relatively low position error over each revolution of the resolver rotor, can be obtained with a resolver having only the flux absorbing element 140.

Figure 5:
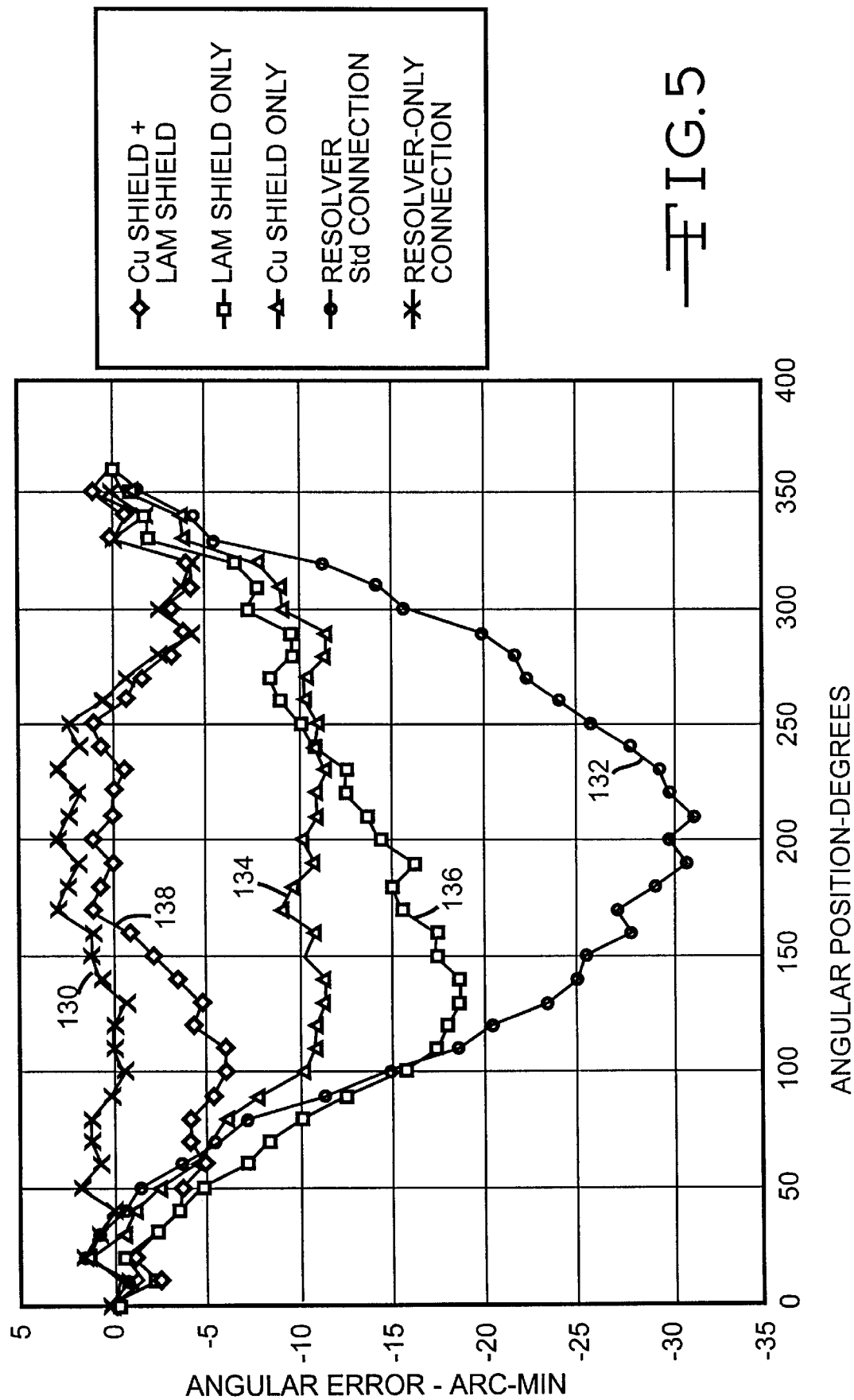
FIG. 5 is a graph including error characteristics and further illustrating attributes of the resolver according to the present invention.

The resolver according to the present invention is illustrated further by the error curves on FIG. 5 which were obtained by a procedure similar to that described above in connection with FIGS. 3 and 4. Curve 130 shows the error obtained with direct rotor excitation, i.e. when excitation is applied directly to the resolver rotor winding rather than via the rotary transformer. Curve 132 shows the error obtained when the resolver is excited through the rotary transformer, i.e. the standard resolver connection. Curve 134 shows the error obtained during the standard resolver connection, i.e. excitation through the rotary transformer, and with provision of the flux absorbing ring 100. A significant reduction in position error can be seen in FIG. 5 when comparing curve 134 to curve 132. Curve 136 shows the error obtained during standard resolver electrical connection and with provision of the flux absorbing element 140 alone, and curve 138 shows the error obtained during standard resolver electrical connection when both flux absorbing elements 100 and 140 are provided in the resolver of the present invention. Curve 138 demonstrates that with provision of both flux absorbing elements 100 and 140 according to the present invention, the position error is not greater than about 5 minutes over each revolution of the resolver rotor.

The improvement provided by the present invention is applicable to both single speed and multi-speed resolvers as well as to housed and to frameless resolvers. The improvement of the present invention also is applicable to inside-out resolvers, which are outer rotor devices. In this type of resolver the stator is the inner member and does not rotate; the rotor is the outer member and does rotate. The primary of the rotary transformer is still on the stator, as are the output signal windings (sine and cosine). The flux absorbing elements 100 and 140 are located between the transformer primary and the output (stator) windings.

It is therefore apparent that the present invention accomplishes its intended objects. Resolver 10 of the present invention exhibits a dramatic and significant reduction in the rotor position error caused by leakage flux and crosstalk in prior art resolvers. This is provided by a relatively simple structure which is economical to manufacture.

While an embodiment of the present invention has been described in detail that is done for the purpose of illustration, not limitation.

What is claimed is:

1. A brushless resolver comprising:
    a) a housing;
    b) a rotor rotatably mounted in said housing;
    c) a rotary transformer comprising a first winding carried by said housing and a second winding on said rotor and operatively associated with said first winding;
    d) means for supplying electrical excitation to said transformer first winding;
    e) a resolver comprising a stator winding carried by said housing and a rotor winding on said rotor and operatively associated with said stator winding;
    f) means for obtaining electrical output from said resolver stator winding;
    g) first means in said housing between said rotary transformer and said resolver for absorbing a principal component of leakage electromagnetic flux from said rotary transformer, said first means comprising an element of material selected to create eddy currents therein when exposed to electromagnetic flux; and
    h) second means comprising an element of ferromagnetic material in said housing between said first means and said resolver for absorbing an additional component of the leakage electromagnetic flux;
    i) so that any deviation between the indicated electrical position of said rotor and the actual mechanical position of the rotor during each revolution of said rotor is reduced.

2. A resolver according to claim 1, wherein said first and second means are disposed substantially parallel to each other and substantially perpendicular to the direction of leakage electromagnetic flux.

3. A resolver according to 1, wherein said first and second means are located between said first winding of said rotary transformer and said resolver stator winding and wherein said second means is located between said first means and said resolver stator winding.

4. A resolver according to claim 1, wherein said first means is of copper.

5. A resolver according to claim 1, wherein said first means is located between said first winding of said rotary transformer and said resolver stator winding.

6. A resolver according to claim 1, wherein said first means is in the form of a ring disposed in a plane substantially normal to the direction of said leakage electromagnetic flux.

7. A resolver according to claim 1, wherein said second means is of ferromagnetic material.

8. A resolver according to claim 1, wherein said second means is in the form of a ring disposed in a plane substantially normal to the direction of the leakage electromagnetic flux.

9. A resolver according to claim 1, wherein said first and second flux absorbing means are located in spaced relation between said first winding of said rotary transformer and said resolver stator winding.

10. A resolver according to claim 1, wherein each of said first and second flux absorbing means is in the form of a ring disposed in a plane substantially normal to the direction of said leakage electromagnetic flux.

11. A resolver according to claim 1, wherein said second flux absorbing means is located between said first flux absorbing means and said resolver stator winding.

12. A brushless resolver comprising:

a) a housing;

b) a rotary transformer within said housing;

c) a resolver within said housing and spaced from said rotary transformer by an air gap; and d) electromagnetic flux absorbing means in said housing and in said air gap between said rotary transformer and said resolver for absorbing leakage electromagnetic flux from said rotary transformer so as to reduce deviation between the indicated electrical position of said rotor and the actual mechanical position of the rotor during each revolution of said rotor, said electromagnetic flux absorbing means comprising an element of ferromagnetic material disposed substantially perpendicular to the direction of leakage electromagnetic flux from said rotary transformer.

13. A resolver according to claim 12, wherein said rotary transformer comprises a first winding carried by said housing and a second winding on said rotor and operatively associated with said first winding, wherein said resolver comprises a stator winding carried by said housing and a rotor winding on said rotor and operatively associated with said stator winding, and wherein said flux absorbing means is located between said first winding of said rotary transformer and said resolver stator winding.

14. A resolver according to claim 13, wherein said flux absorbing means is in the form of a ring.

15. A resolver according to claim 12, wherein said flux absorbing means is in the form of a ring.

* * * * *